(12) United States Patent  
Hasegawa

(10) Patent No.: US 9,053,383 B2
(45) Date of Patent: Jun. 9, 2015

(54) RECOGNIZING APPARATUS AND METHOD, PROGRAM, AND RECORDING MEDIUM

(75) Inventor: Yuichi Hasegawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 300 days.

(21) Appl. No.: 13/462,074

(22) Filed: May 2, 2012

(65) Prior Publication Data

US 2012/0314939 A1 Dec. 13, 2012

(30) Foreign Application Priority Data

Jun. 13, 2011 (JP) ................................. 2011-131681

(51) Int. Cl.
*G06K 9/62* (2006.01)
*G06K 9/46* (2006.01)

(52) U.S. Cl.
CPC ................ *G06K 9/4633* (2013.01); *G06K 9/46* (2013.01); *G06K 9/62* (2013.01)

(58) Field of Classification Search
None
See application file for complete search history.

(56) References Cited

U.S. PATENT DOCUMENTS

| 5,638,465 A * | 6/1997 | Sano et al. ..................... 382/281 |
| 8,208,757 B2 * | 6/2012 | Sakurai ......................... 382/281 |
| 2010/0208983 A1 * | 8/2010 | Iwai et al. ..................... 382/159 |
| 2012/0154588 A1 * | 6/2012 | Kim et al. ..................... 348/148 |

FOREIGN PATENT DOCUMENTS

JP 2009-140283 6/2009

* cited by examiner

*Primary Examiner* — Matthew Bella
*Assistant Examiner* — Jose M Torres
(74) *Attorney, Agent, or Firm* — Oblon, McClelland, Maier & Neustadt, L.L.P.

(57) ABSTRACT

A predetermined feature point obtained from an input image is extracted. An image that indicates a locus specifying a predetermined graphic included in the input image and corresponds to a feature point is acquired using a Hough transform. A recognition target object is detected from an input image, based on a plurality of feature quantities, using an identifier generated by statistical learning using the plurality of feature quantities obtained from a locus image obtained based on a learning image including the recognition target object and a locus image obtained based on a learning image including no recognition target object.

9 Claims, 12 Drawing Sheets

FIG.6
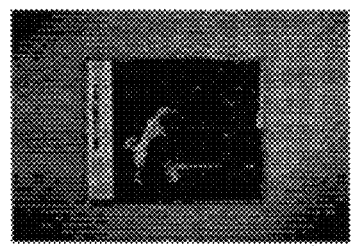
FIG.7
| 0 | −1 | 0 |
|---|---|---|
| −1 | 4 | −1 |
| 0 | −1 | 0 |
FIG.8
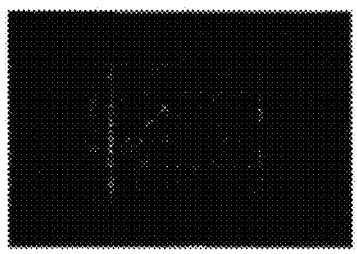
EDGE IMAGE
FIG.9
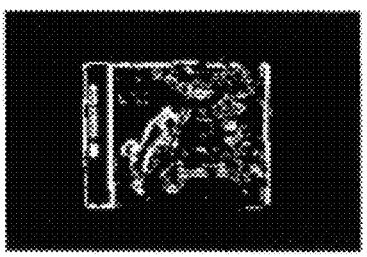
BINARY EDGE IMAGE

THINNED EDGE IMAGE

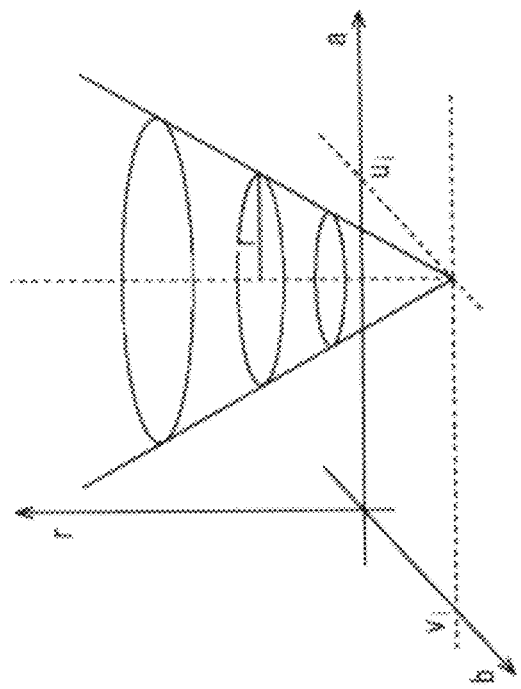
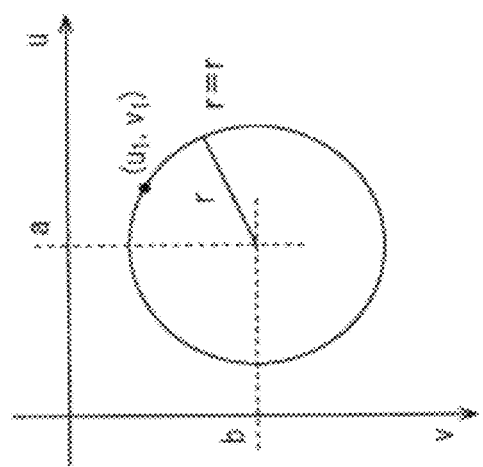
FIG.15

RECOGNIZING APPARATUS AND METHOD, PROGRAM, AND RECORDING MEDIUM

BACKGROUND

The present technology relates to a recognizing apparatus and method, a program, and a recording medium, and more particularly, to a recognizing apparatus and method, a program, and a recording medium, which are capable of further increasing a resistance characteristic against image loss, noise, and the like in techniques related to image recognition.

In the past, a contour feature quantity obtained by edge extraction has been used as a main feature quantity for detecting (recognizing) an object from an image. In this technique, various modifications of the contour feature quantity obtained by edge extraction are defined as a new feature quantity, and recognition of an object is performed.

Further, for example, a statistical learning by boosting has been used for various image recognition tasks as an efficient machine learning method. For example, a statistical machine learning method called AdaBoost has been known as a machine learning method.

In AdaBoost, a weak identifier (which is also referred to as a weak learner) is generated using a learning image including a target object that is desired to be detected and a learning image including no target object, and a strong identifier is constructed by combining many weak identifiers. Using the strong identifier obtained in the above-described way, a target object can be detected from any image.

Further, for example, a technique by which an object can be detected from an image using an integrated identifier when a feature of similarity of texture of two areas can be sufficiently extracted from the input image, even when it is difficult to sufficiently extract a contour from the input image, has been proposed (for example, see Japanese Patent Application Laid-Open No. 2009-140283).

SUMMARY

However, in image recognition by statistical learning according to the related art, when a part of an object to be recognized in a learning image used as a sample remains hidden behind another object, it is difficult to appropriately learn a feature point of an object to be recognized.

Further, for example, when an edge is extracted from a learning image used as a sample and statistical learning is performed on a feature point, different edges may be extracted from the same object depending on a camera's performance, contrast of an image, the magnitude of noise, and the like. In this case, it is difficult to appropriately recognize a target object even when an identifier obtained by statistical learning is used.

As described above, the technique related to the image recognition by the statistical learning according to the related art has a problem in that it is difficult to increase a resistance characteristic against image loss, noise, and the like.

The present technology is made in light of the foregoing, and it is desirable to be able to further increase a resistance characteristic against image loss, noise, and the like in a technique related to image recognition.

According to an embodiment of the present technology, there is provided a recognizing apparatus which includes a Hough transform unit that executes a Hough transform on an input image, and a detecting unit that detects a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

The Hough transform unit may acquire a locus image that is an image in which a locus for specifying a predetermined graphic included in the input image is displayed and corresponds to a feature point using the Hough transform, and the detecting unit may detect the recognition target object from the input image, based on a plurality of feature, quantities using an identifier generated by statistical learning that uses the plurality of feature quantities, the plurality of feature quantities being obtained from the locus image obtained based on the learning image including the recognition target object and the locus image obtained based on the learning image including no recognition target object.

The recognizing apparatus may further include a feature point extracting unit that extracts a predetermined feature point obtained from the input image. The feature point extracting unit may extract the feature point from an edge image obtained by executing a predetermined filtering process on the input image, and data obtained by executing the Hough transform may include data of an image in which a locus for specifying a predetermined graphic included in the edge image is displayed.

The recognizing apparatus may further include a feature point extracting unit that extracts a predetermined feature point obtained from the input image, and the feature point extracting unit may extract the feature point from an image in which a pixel value of an edge image obtained by executing a predetermined filtering process on the input image is binarized by a predetermined threshold determination and an edge is thinned.

The Hough transform unit may acquire a locus image that is an image in which a locus for specifying a predetermined graphic included in the input image is displayed and corresponds to a feature point using the Hough transform, and the locus image may include as an image in which a locus obtained by voting on the feature point in a parameter space in which each parameter of a formula representing a predetermined graphic is used as an axis is displayed.

The Hough transform unit may acquire a locus image that is an image in which a locus for specifying a predetermined graphic included in the input image is displayed and corresponds to a feature point and corresponds to a feature point using the Hough transform, and the Hough transform unit may specify a predetermined graphic by a function related to polar coordinates and acquire a locus image corresponding to the feature point using the Hough transform.

According to another embodiment of the present technology, there is provided a recognizing method which includes executing a Hough transform on an input image by a Hough transform unit, and detecting, by a detecting unit, a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

According to another embodiment of the present technology, there is provided a program for causing a computer to function as a Hough transform unit that executes a Hough transform on an input image, and a detecting unit that detects a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

According to an embodiment of the present technology, a Hough transform is executed on an input image, and a recognition target object is detected from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

According to the embodiments of the present technology, it is possible to further increase a resistance characteristic against image loss, noise, and the like in a technique related to image recognition.

BRIEF DESCRIPTION OF THE DRAWINGS

FIG. 6 is a diagram illustrating an example of an input image in the Hough transform;

FIG. 7 is a diagram illustrating a configuration example of a filter for extracting an edge of an image;

FIG. 8 is a diagram illustrating an example of an edge image obtained from the image of FIG. 6;

FIG. 9 is a diagram illustrating an example of an image obtained by binarizing a pixel value of the edge image of FIG. 8;

FIG. 15 is a diagram to explain an example of detecting a circle using the Hough transform.

DETAILED DESCRIPTION OF THE EMBODIMENT(S)

Hereinafter, embodiments of the present technology will be described with reference to the accompanying drawings.

First, a technique related to image recognition by statistical learning according to a related art will be described.

Figure 1:
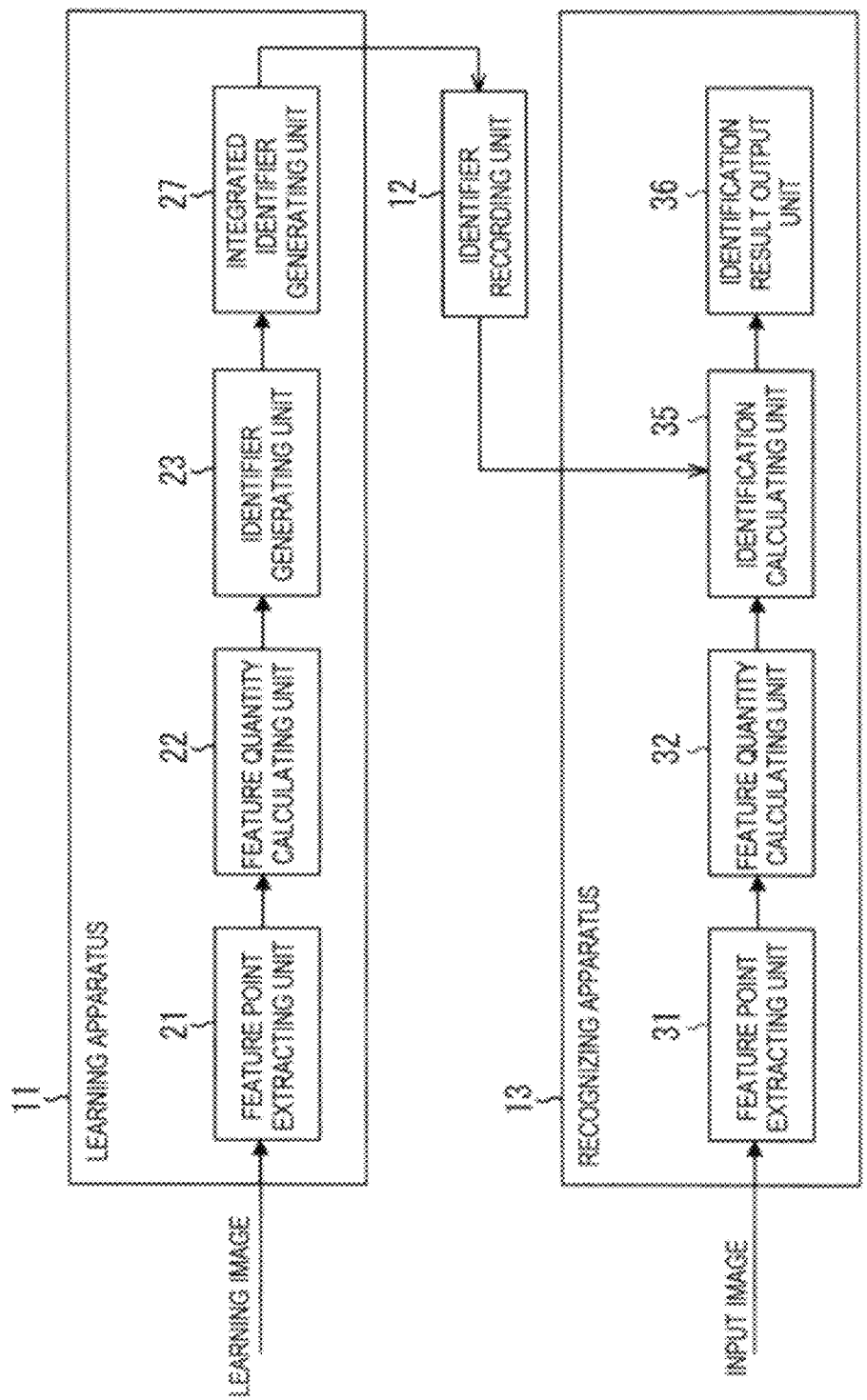
FIG. 1 is a block diagram illustrating a configuration example of an image identifying system according to a related art.

FIG. 1 is a block diagram illustrating a configuration example of an embodiment of an image identifying system according to a related art. The image identifying system includes a learning apparatus 11, an identifier recording unit 12, and a recognizing apparatus 13. The image identifying system provides a function of recognizing an area of an input image in which an image of a recognition target object is present.

The learning apparatus 11 is used when the recognizing apparatus 13 performs a process of identifying the presence or absence of a recognition target object in an image based on an input learning image. The learning apparatus 11 generates an identification feature quantity and an integrated identifier and records the identification feature quantity and the integrated identifier in the identifier recording unit 12. The recognizing apparatus 13 identifies whether or not an image of a recognition target object is present in an input image using the identification feature quantity and the integrated identifier recorded in the identifier recording unit 12, and outputs the identification result.

The learning apparatus 11 includes a feature point extracting unit 21, a feature quantity calculating unit 22, an identifier generating unit 23, and an integrated identifier generating unit 27.

The feature point extracting unit 21 extracts several pixels of the input learning image from the learning image as feature points used to generate an identifier, and supplies the feature points and the learning image to the feature quantity calculating unit 22. Here, the identifier refers to a strong identifier, which includes a plurality of weak identifiers, generated by statistical learning.

A plurality of images including a recognition target object and a plurality of images including no recognition target object are input as learning images, and the learning image includes true-false information representing whether or not a recognition target object is included in each learning image.

The feature quantity calculating unit 22 calculates a feature quantity on each feature point supplied from the feature point extracting unit 21, and supplies the obtained feature quantity and the learning image to the identifier generating unit 23. For example, when a pixel at a predetermined position in an image is extracted as a feature point, a numerical value representing a degree to which the corresponding pixel is a pixel configuring an edge is used as a feature quantity.

The identifier generating unit 23 performs, for example, a statistical learning process by AdaBoost based on the learning image and the feature quantity supplied from the feature quantity calculating unit 22, and generates an identifier for recognizing the recognition target object. The identifier generating unit 23 supplies the generated identifier to the integrated identifier generating unit 27.

The integrated identifier generating unit 27 generates an integrated identifier by integrating the identifiers received from the identifier generating unit 23, and supplies the generated integrated identifier to be recorded in the identifier recording unit 12. The integrated identifier generating unit 27 supplies the feature quantity of the feature point, used when recognition of the recognition target object is performed using the integrated identifier, to be recorded in the identifier recording unit 12 as an identification feature quantity.

The recognizing apparatus 13 includes a feature point extracting unit 31, a feature quantity calculating unit 32, an identification calculating unit 35, and an identification result output unit 36. The feature point extracting unit 31 and the feature quantity calculating unit 32 of the recognizing apparatus 13 perform the same process as the feature point extracting unit 21 and the feature quantity calculating unit 22 of the learning apparatus 11 on the input image from which the recognition target object is recognized. Thus, the redundant description will not be repeated.

The identification calculating unit 35 reads the identification feature quantity and integrated identifier recorded in the identifier recording unit 12. The identification calculating unit 35 performs a calculation by substituting a feature quantity corresponding to the identification feature quantity among the feature quantities received from the feature quantity calculating unit 32 for the read integrated identifier. The identification result output unit 36 acquires a calculation result through the identification calculating unit 35, and outputs an identification result about whether or not the recognition target object has been recognized through the input image based on the calculation result.

Figure 2:
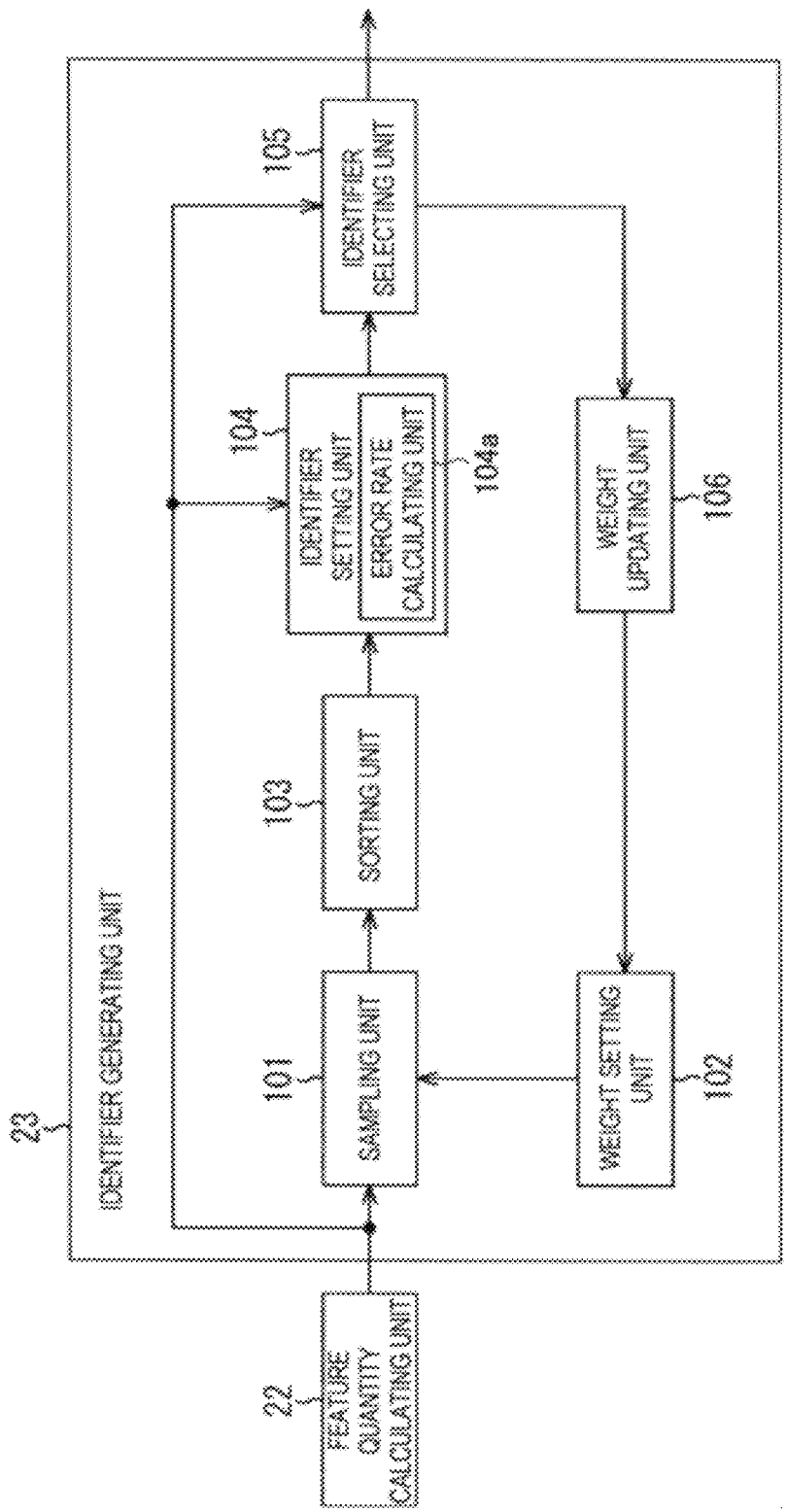
FIG. 2 is a block diagram illustrating a further detailed configuration example of an identifier generating unit illustrated in FIG. 1.

FIG. 2 is a block diagram illustrating a further detailed configuration example of the identifier generating unit 23 illustrated in FIG. 1. As illustrated in FIG. 2, the identifier generating unit 23 includes a sampling unit 101, a weight setting unit 102, a sorting unit 103, an identifier setting unit 104, an identifier selecting unit 105, and a weight updating unit 106.

For example, the sampling unit 101 performs sampling on M feature quantities among feature quantities of feature points of a plurality of learning images, which are present at the same position, according to a weight of a learning image unit set by the weight setting unit 102, and supplies the sampling result to the sorting unit 103.

For example, the sorting unit 103 sorts the M sampled feature quantities in ascending order or descending order, and supplies the sorted feature quantities to the identifier setting unit 104.

The identifier setting unit 104 performs control such that the error rate calculating unit 104a calculates an error rate while changing a threshold on each of the feature quantities sorted in ascending order or descending order based on the true-false information representing whether or not the recognition target object is included in the learning image. Then, the identifier setting unit 104 sets a threshold that causes the error rate to be minimum (this threshold is set as a weak identifier). Further, the identifier setting unit 104 supplies the error rate of each weak identifier to the identifier selecting unit 105.

The identifier selecting unit 105 selects a weak identifier causing the error rate to be minimum among the weak identifiers, updates an identifier including the weak identifier, and supplies a final identifier and a feature quantity corresponding to the identifier to the integrated identifier generating unit 27. Further, the identifier selecting unit 105 calculates a reliability degree based on the error rate of the selected weak identifier, and supplies the calculated reliability degree to the weight updating unit 106.

The weight updating unit 106 re-calculates a weight of each learning image based on the received reliability degree, normalizes and updates the weight, and supplies the update result to the weight setting unit 102. The weight setting unit 102 sets a weight of a learning image based on the update result of the weight supplied from the weight updating unit 106.

As described above, the image recognition by the image identifying system according to the related art is performed. For example, a technique related to image recognition by statistical learning according to the related art is disclosed in detail in Japanese Patent Application Laid Open No. 2009-140283.

However, in the image recognition by statistical learning according to the related art, when a part of recognition target object in a learning image remains hidden behind another object, it is difficult to appropriately learn a feature point of an object to be recognized.

Further, for example, when an edge is extracted from a learning image and statistical learning is performed on a feature point, different edges may be extracted from the same object depending on a camera's performance, contrast of an image, the magnitude of noise, and the like. In this case, it is difficult to appropriately recognize a target object even when an identifier obtained by statistical learning is used.

As described above, the technique related to the image recognition by the statistical learning according to the related art has a problem in that it is difficult to increase a resistance characteristic against image loss, noise, and the like.

In this regard, in the present technology, image recognition by statistical learning using a Hough transform is performed.

Next, the Hough transform will be described.

The Hough transform is a technique for detecting a straight line from an image and was proposed by Paul Hough. Since then, the Hough transform has been extended to be able to detect an analytical graphic such as a circular shape or an elliptical shape.

By performing image recognition using the Hough transform, a recognition target object can be stably detected from an image having imperfect information such as noise in an image, an error from imperfection of an analysis algorithm, occlusion, and loss.

Graphic detection by the Hough transform is a graphic detecting technique in which, when a feature point in an image is given, an assumption related to all graphics including the feature point is generated, and when the same hypothesis is supported by many feature points, the hypothesis is regarded as being correct. Since the detecting technique is based on "integration of information by voting" and "principle of majority voting," there is a feature that stable detection can be performed as a whole even when an error or loss is included in individual information.

Next, detection of a graphic by the Hough transform will be described. Here, an example of detecting a straight line will be described.

Here, it is assumed that a straight line is formed by a plurality of feature points in an image. The straight line in the image is expressed by Formula (1). In Formula (1), the position of a pixel in an image is represented by (x, y) coordinates, and variables a and b are used as parameters to decide an inclination and the position of a straight line.

$$y = ax + b \tag{1}$$

In Formula (1), when coordinates $(x_i, y_i)$ $(i=1, 2, \ldots, n)$ of a feature point are given, a locus represented by Formula (2) is predicted in a two-dimensional space (ab space) in which the parameters of the straight line of Formula (1) are used as axes.

$$b = -x_i a + y_i \tag{2}$$

Figure 3:
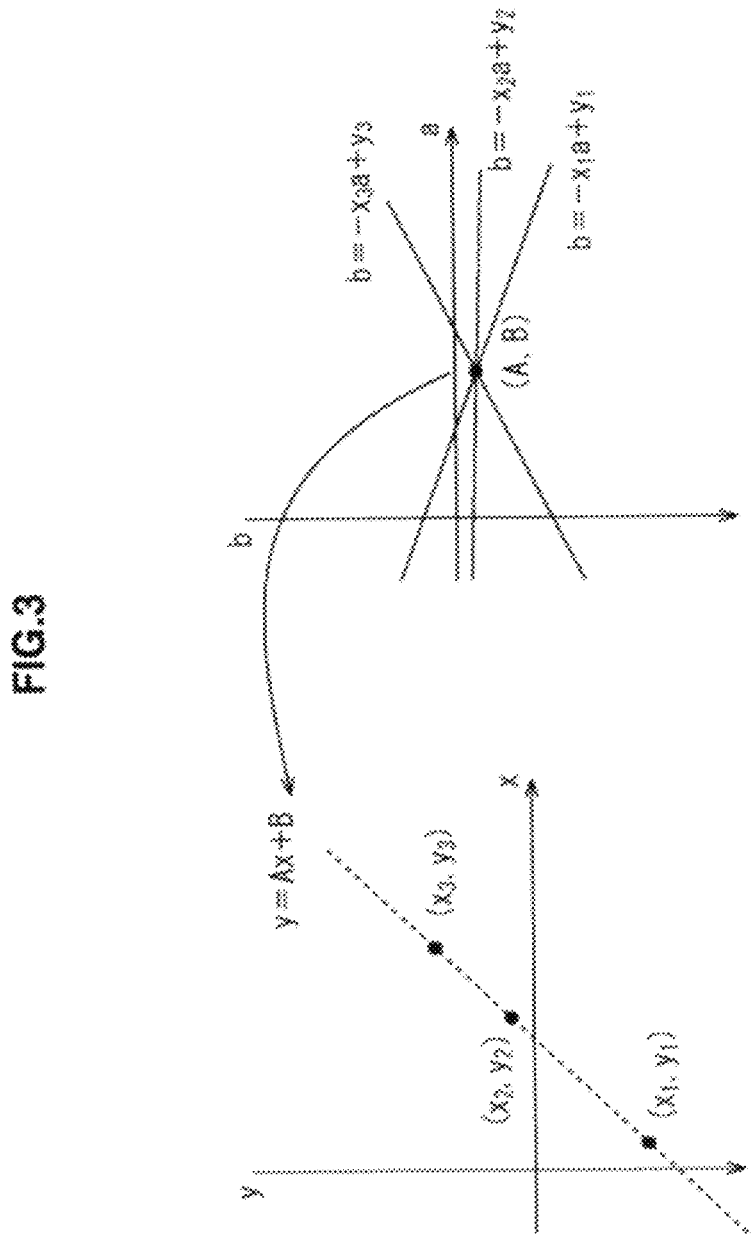
FIG. 3 is a diagram illustrating an example of a locus obtained by voting on a feature point on a straight line in a parameter space.

For example, three feature points represented by coordinates $(x_1, y_1)$, coordinates $(x_2, y_2)$, and coordinates $(x_3, y_3)$ are presented in an image as illustrated in the left side of FIG. 3. In this case, it is assumed that three loci are depicted in the ab space in which the parameters of the straight line are used as the axes as illustrated in the right side of FIG. 3. An intersection point (A, B) of the loci corresponds to a straight line passing through three feature points in an xy space at the left side of FIG. 3, and this allows the presence of a straight line, represented by Formula (3), in an image to be detected.

$$Y = Ax + B \quad (3)$$

However, since a value of the variable a becomes infinite when a vertical line in an image is expressed by Formula (1), there is a limitation to detecting a straight line by the above-described method. For this reason, polar coordinates are often used in the Hough transform.

Figure 4:
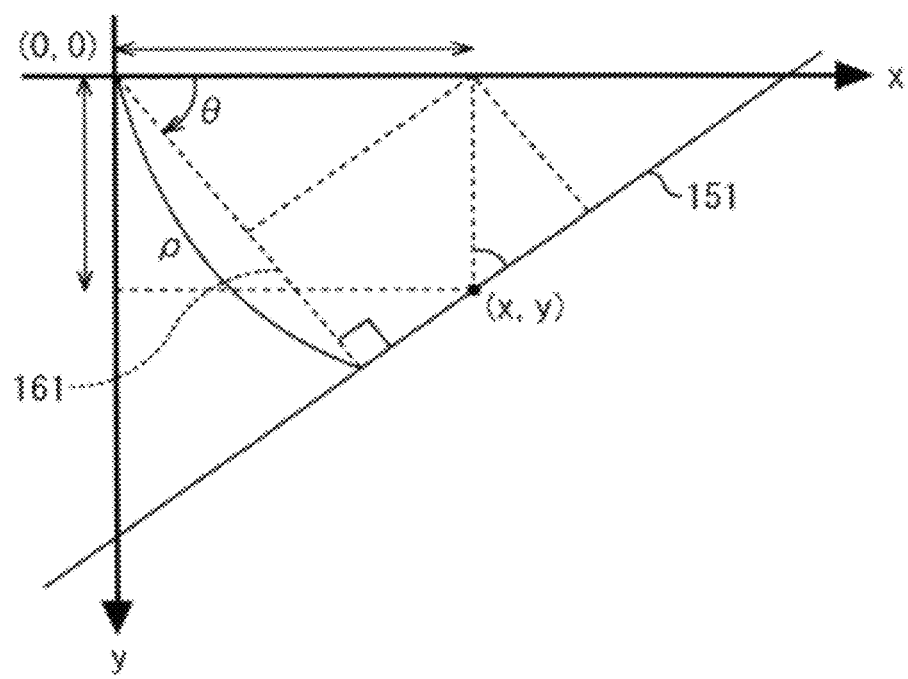
FIG. 4 is a diagram to explain an example of representing a straight line using polar coordinates.

For example, when a straight line 151 is assumed to be detected and the straight line 151 is represented using polar coordinates as illustrated in FIG. 4, the straight line is represented as in Formula (4).

$$y = -(\cos\theta/\sin\theta)x + \rho/\sin\theta \quad (4)$$

In Formula (4), a variable $\rho$ represents a straight line passing through an original point (0,0), and when a vertical line 161 is drawn on the straight line 151, the variable $\rho$ is a distance between the original point and an intersection point between the vertical line 161 and the straight line 151. Further, in Formula (4), a variable $\theta$ represents an angle formed between the vertical line 161 and an x axis.

When Formula (4) is substituted for Formula (1), a can be represented by Formula (5), and b can be represented by Formula (6).

$$a = -(\cos\theta/\sin\theta) \quad (5)$$

$$b = \rho/\sin\theta \quad (6)$$

Figure 5:
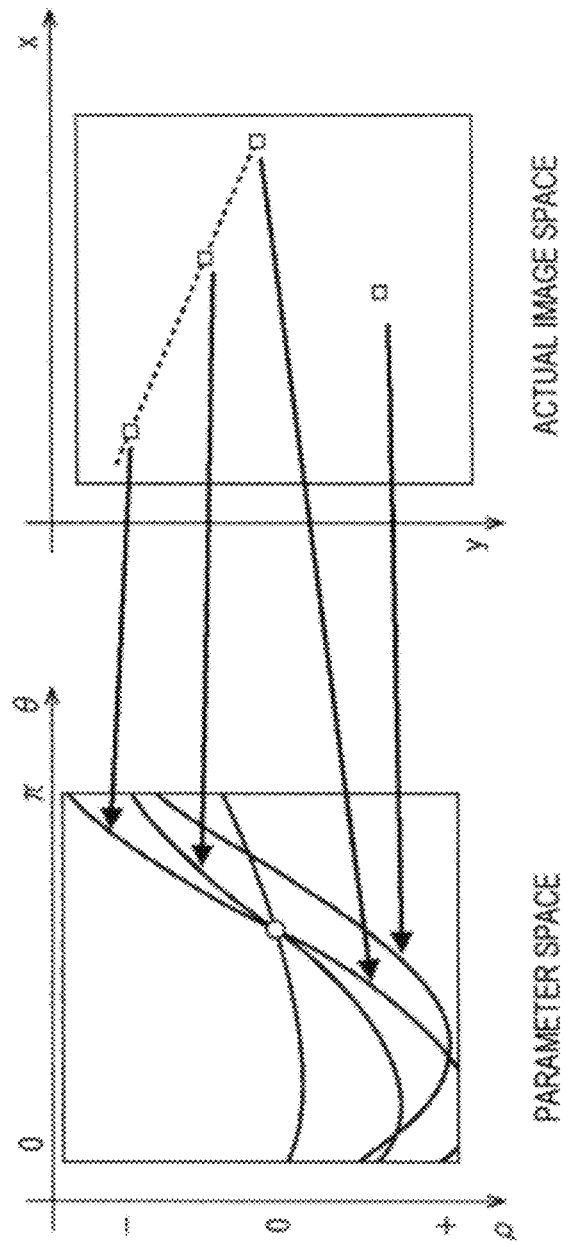
FIG. 5 is a diagram illustrating another example of a locus obtained by voting on a feature point on a straight line in a parameter space.

Thus, similarly to the example described above with reference to FIG. 3, each feature point on a straight line in an actual image space (xy space) is represented by a locus in a parameter space ($\rho\theta$ space) as illustrated in FIG. 5.

FIG. 5 is a diagram illustrating loci in the $\rho\theta$ space corresponding to three feature points present on a straight line in the xy space and a locus in the $\rho\theta$ space corresponding to one feature point not present on the straight line in the xy space. The left side of FIG. 5 represents the parameter space ($\rho\theta$ space), a horizontal axis represents a value of $\theta$, and a vertical axis represents a value of $\rho$. The right side of FIG. 5 represents the actual image space (xy space), a horizontal axis represents a value of x, and a vertical axis represents a value of y. In this case, all loci in the parameter space draw curves of a trigonometric function expressed by Formula (7) which will be described later.

As illustrated in FIG. 5, the loci in the $\rho\theta$ space corresponding to three feature points present on a straight line in the xy space intersect at one point in the $\rho\theta$ space at the left side of FIG. 5. However, the locus in the $\rho\theta$ space corresponding to one feature point not present on the straight line in the xy space does not intersect with another locus.

As illustrated in FIG. 5, by analyzing an image using the Hough transform, the presence of a straight line in an image is detected by an intersection point ($\rho$, $\theta$) of the loci.

In the Hough transform, a process of obtaining a locus in the parameter space corresponding to a feature point is referred to as "voting" on a feature point in the parameter space. Further, in the Hough transform, an intersection point of loci is referred to as a "peak," and a process of detecting an intersection point of loci is referred to as "peak detection."

For example, detection of an object in an actual image using the Hough transform is performed as follows. For example, an example of recognizing an image of a CD sleeve illustrated in FIG. 6 is considered.

First, an image illustrated in FIG. 6 is input, and an edge of the image is extracted. At this time, for example, gray scaling (RGB-averaging, a calculation of Y of YUV, and the like) is performed on the input image, and a filtering process for edge detection is performed. For example, a 3×3 filtering process illustrated in FIG. 7 is performed to extract an edge of the gray-scaled image.

FIG. 8 illustrates an edge image obtained such that the image illustrated in FIG. 6 is gray-scaled and then the filtering process of FIG. 7 is performed. As illustrated in FIG. 8, an edge in the image of FIG. 6 is displayed in white, and portions other than the edge are displayed in black.

Figure 10:
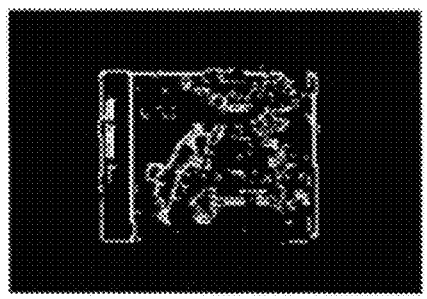
FIG. 10 is a diagram illustrating an example of an image obtained by thinning an edge of the image of FIG. 9.

Then, a pixel value of the edge image is binarized by a predetermined threshold determination, and the edge is thinned. FIG. 9 is a diagram illustrating an example of an image obtained by binarizing a pixel value of the edge image of FIG. 8. FIG. 10 is a diagram illustrating an example of an image obtained by thinning an edge of the image of FIG. 9.

Further, for example, voting in the parameter space is performed using each pixel of the image illustrated in FIG. 10 as a feature point. For example, when a feature point of an actual image space is represented by (x, y), a locus obtained by voting is expressed by Formula (7).

$$\rho = x\cos\theta + y\sin\theta \quad (7)$$

For example, the image illustrated in FIG. 10 is raster-scanned, and a locus of Formula (7) in which each of coordinate positions of all pixels is represented by a feature point (x, y) is depicted within the parameter space. A value of a pixel of a feature point is used as a value (for example, a pixel value) related to a locus depicted within the parameter space. In this way, portions displayed brightly due to loci corresponding to pixels of edges in the actual image space overlapping each other appear in the parameter space. These portions are peaks.

Figure 11:
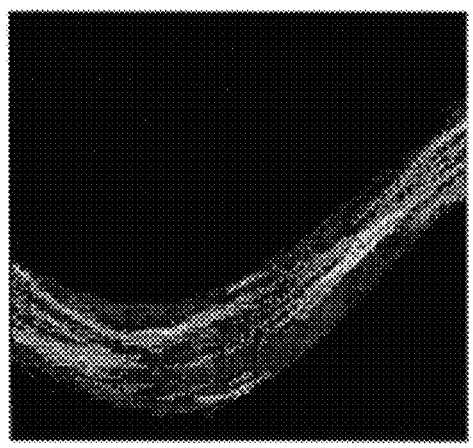
FIG. 11 is a diagram illustrating an example of a locus obtained by voting on a pixel of the image of FIG. 10 in a parameter space as a feature point.

FIG. 11 is a diagram illustrating an example of a locus in the parameter space obtained from the image illustrated in FIG. 10. In FIG. 10, a horizontal axis represents a value of $\theta$, and a vertical axis represents a value of $\rho$. As illustrated in FIG. 10, since loci corresponding to pixels of edges in the actual image space overlap each other and so are displayed brightly, a peak can be detected using the loci. In the example of FIG. 11, a locus in the parameter space obtained from the image illustrated in FIG. 10 is displayed as an image, but actually, data specifying a locus in the image is obtained by the Hough transform.

Based on a peak obtained as described above, a straight line such as an edge present in an image can be specified, and so the shape of an object can be recognized.

In the above-described example, an edge image is binarized and thinned before voting in the parameter space is performed. However, voting in the parameter space may be performed using each pixel of an edge image as a feature point as is.

As described above, detection of an object of an actual image using the Hough transform is performed.

As described above, since detection of an object using the Hough transform is a detecting technique based on "integration of information by voting" and "principle of majority voting," there is a feature that stable detection can be performed as a whole even when an error or loss is included in individual information.

For example, even when a part of a recognition target object in an image (referred to as a "learning image") input to a learning apparatus (which will be described later) remains hidden behind another object, the presence of a straight line configuring an edge can be detected from a feature point of a non-hidden portion. Further, even when slightly different edges are extracted depending on a camera's performance, contrast of an image, the magnitude of noise, and the like, peak detection can be stably performed since loci of the parameter space corresponding to a plurality of feature points are obtained.

In the present technology, the characteristics of the Hough transform described above are used to further increase a resistance characteristic against image loss, noise, and the like in a technique related to image recognition.

Figure 12:
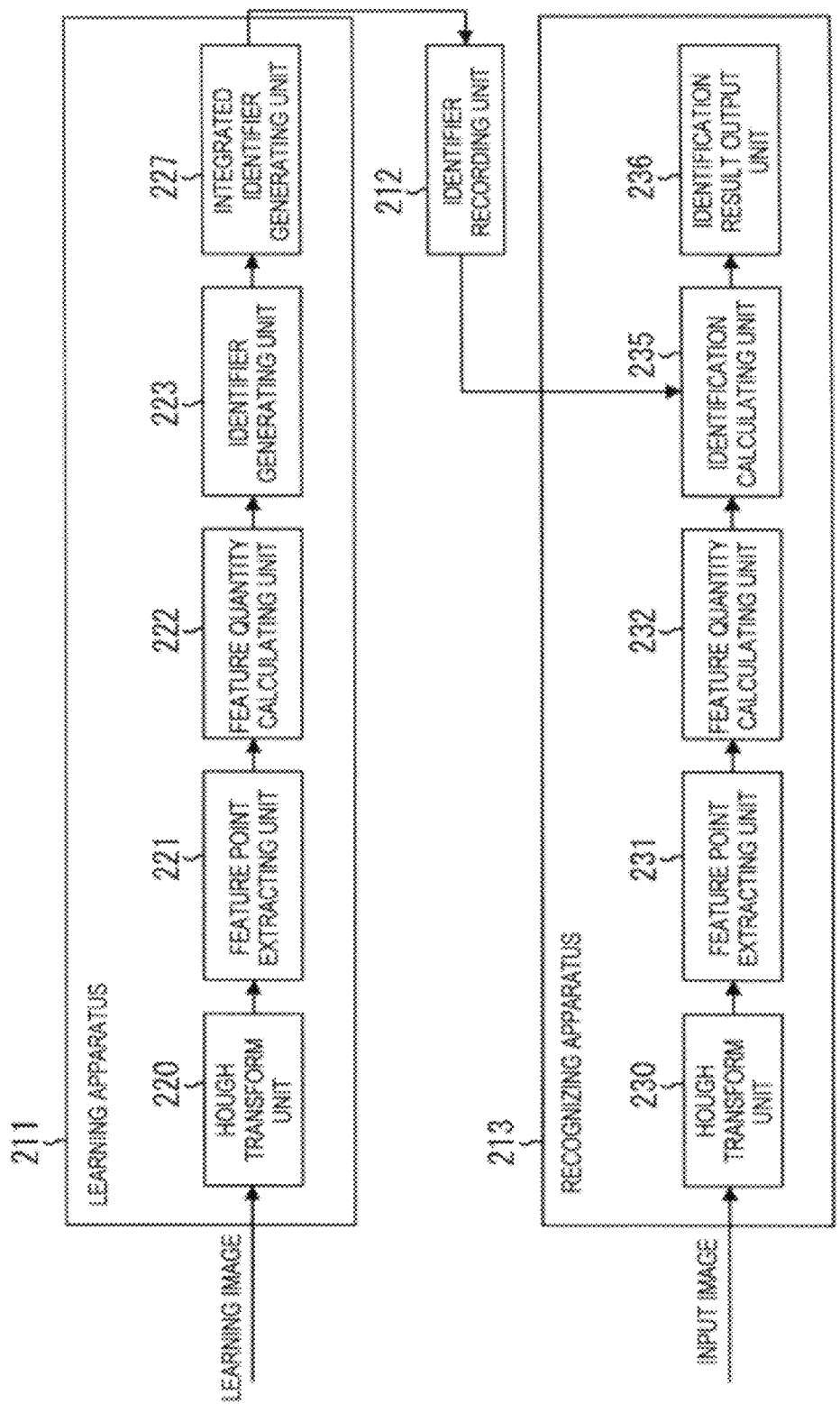
FIG. 12 is a block diagram illustrating a configuration example of an embodiment of an image identifying system according to the present technology.

FIG. 12 is a block diagram illustrating a configuration example of an embodiment of an image identifying system according to the present technology. The image identifying system includes a learning apparatus 211, an identifier recording unit 212, and a recognizing apparatus 213. The image identifying system provides a function of recognizing an area of an input image in which an image of a recognition target object is present.

The learning apparatus 211 is used when the recognizing apparatus 213 performs a process of identifying the presence or absence of a recognition target object in an image based on an input learning image. The learning apparatus 211 generates an identification feature quantity and an integrated identifier and records the identification feature quantity and the integrated identifier in the identifier recording unit 212. The recognizing apparatus 213 identifies whether or not an image of a recognition target object is present in an input image using the identification feature quantity and the integrated identifier recorded in the identifier recording unit 212, and outputs the identification result.

The learning apparatus 211 includes a Hough transform unit 220, a feature point extracting unit 221, a feature quantity calculating unit 222, an identifier generating unit 223, and an integrated identifier generating unit 227.

The Hough transform unit 220 performs the Hough transform and obtains a locus in the parameter space corresponding to the learning image as described above. That is, voting for each feature point in the parameter space is performed based on an edge image obtained by extracting an edge of the learning image. An image of a locus within the parameter space obtained as a result of voting is supplied to the feature point extracting unit 221. The above-mentioned image of the locus within the parameter space is not actually an image and is treated as data representing a numerical value of each coordinate position or the like. Thus, for example, the image of the locus processed in the image identifying system of FIG. 12 is regarded to represent data (data related to a locus) corresponding to the corresponding image.

The feature point extracting unit 221 extracts several pixels of the image from the data related to the locus within the parameter space supplied from the Hough transform unit 220 as feature points used to generate an identifier, and supplies the feature points and the learning image to the feature quantity calculating unit 222. Here, the identifier refers to a strong identifier, which includes a plurality of weak identifiers, generated by statistical learning.

A plurality of images including a recognition target object and a plurality of images including no recognition target object are input as learning images, and the learning image includes true-false information representing whether or not a recognition target object is included in each learning image.

The feature quantity calculating unit 222 calculates a feature quantity on each feature point supplied from the feature point extracting unit 221, and supplies the obtained feature quantity and the learning image to the identifier generating unit 223. For example, when a pixel at a predetermined position in an image is extracted as a feature point, a numerical value representing a brightness value of a corresponding pixel is used as a feature quantity.

The identifier generating unit 223 performs, for example, a statistical learning process by AdaBoost based on the data related to the locus and the feature quantity supplied from the feature quantity calculating unit 222, and generates an identifier for recognizing the recognition target object. The identifier generating unit 223 supplies the generated identifier to the integrated identifier generating unit 227.

The integrated identifier generating unit 227 generates an integrated identifier by integrating the identifiers received from the identifier generating unit 223, and supplies the generated integrated identifier to be recorded in the identifier recording unit 212. The integrated identifier generating unit 227 supplies the feature quantity of the feature point, used when recognition of the recognition target object is performed using the integrated identifier, to be recorded in the identifier recording unit 212 as an identification feature quantity.

A detailed configuration of the identifier generating unit 223 illustrated in FIG. 12 is the same as the configuration described with reference to FIG. 2, and thus the redundant description will not be repeated.

The recognizing apparatus 213 includes a Hough transform unit 230, a feature point extracting unit 231, a feature quantity calculating unit 232, an identification calculating unit 235, and an identification result output unit 236. The Hough transform unit 230, the feature point extracting unit 231, and the feature quantity calculating unit 232 of the recognizing apparatus 213 performs the same process as the Hough transform unit 230, the feature point extracting unit 221, and the feature quantity calculating unit 222 of the learning apparatus 11 on the input image from which the recognition target object is recognized. Thus, the redundant description will not be repeated.

The identification calculating unit 235 reads the identification feature quantity and integrated identifier recorded in the identifier recording unit 212. The identification calculating unit 235 performs a calculation by substituting a feature quantity corresponding to the identification feature quantity among the feature quantities received from the feature quantity calculating unit 232 for the read integrated identifier. The identification result output unit 236 acquires a calculation result by the identification calculating unit 235, and outputs an identification result about whether or not the recognition target object has been recognized through the input image based on the calculation result.

Figure 13:
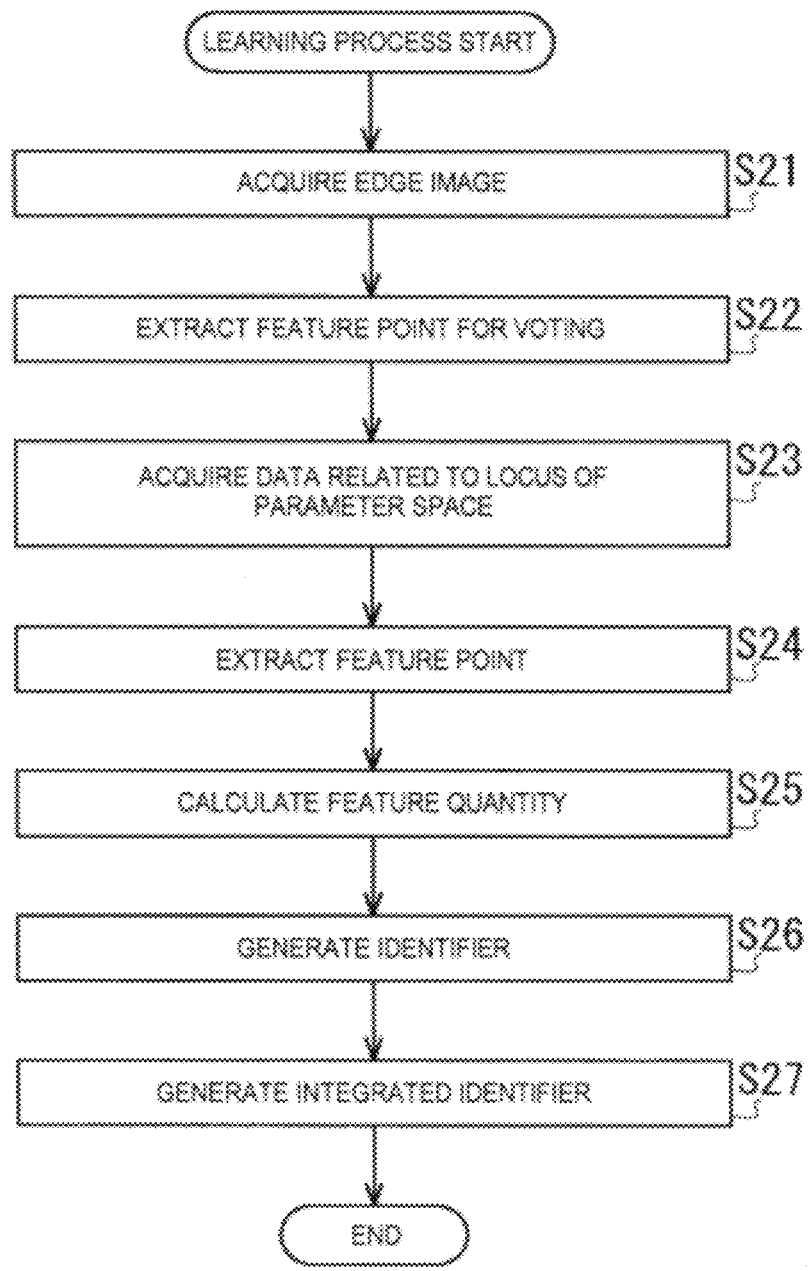
FIG. 13 is a flowchart to explain an example of a learning process by a learning apparatus illustrated in FIG. 12.

Next, an example of a learning process by the learning apparatus 211 illustrated in FIG. 12 will be described with reference to a flowchart of FIG. 13.

In step S21, the Hough transform unit 220 acquires an edge image of a learning image.

In step S22, the Hough transform unit 220 extracts a feature point for voting in the parameter space based on the edge image acquired by the process of step S21. All pixels of the edge image may be extracted as the feature points for voting in the parameter space.

In step S23, the Hough transform unit 220 votes on each feature point extracted in the process of step S22 in the parameter space, and acquires data related to a locus within the parameter space obtained as a result of voting.

In step S24, the feature point extracting unit 221 extracts several pixels of the image from the image acquired in the process of step S23 as feature points used to generate an identifier. All pixels of the image acquired in the process of step S23 may be extracted as feature points.

In step S25, the feature quantity calculating unit 222 calculates a feature quantity on each feature point supplied from the feature point extracting unit 221. At this time, for example, a numerical value representing a brightness value of a pixel is calculated as the feature quantity.

In step S26, the identifier generating unit 223 performs, for example, a statistical learning process by AdaBoost based on the data related to the locus and the feature quantity supplied from the feature quantity calculating unit 222, and generates an identifier for recognizing the recognition target object.

At this time, as described above with reference to FIG. 2, the following process is executed in the identifier generating unit 223.

That is, the sampling unit 101 performs sampling on feature quantities of a plurality of locus images, which are present at the same position, according to a weight of a learning image unit set by the weight setting unit 102, and supplies the sampling result to the sorting unit 103. Then, for example, the sorting unit 103 sorts the sampled feature quantities in ascending order or descending order. The identifier setting unit 104 performs control such that the error rate calculating unit 104a calculates an error rate while changing a threshold on each of the feature quantities sorted in ascending order or descending order based on the true-false information. Then, the identifier setting unit 104 sets a threshold that causes the error rate to be minimum (this threshold is set as a weak identifier). The identifier selecting unit 105 executes a process of selecting a weak identifier causing the error rate to be minimum among the weak identifiers, updating an identifier including the weak identifier, and supplying a final identifier and a feature quantity corresponding to the identifier to the integrated identifier generating unit 27.

In step S27, the integrated identifier generating unit 227 generates an integrated identifier by integrating the identifiers generated in the process of step S26. At this time, the generated integrated identifier is supplied to be recorded in the identifier recording unit 212. Further, the feature quantity of the feature point, used when recognition of the recognition target object is performed using the integrated identifier, is supplied to be recorded in the identifier recording unit 212 as an identification feature quantity.

In this way, the learning process is executed.

Figure 14:
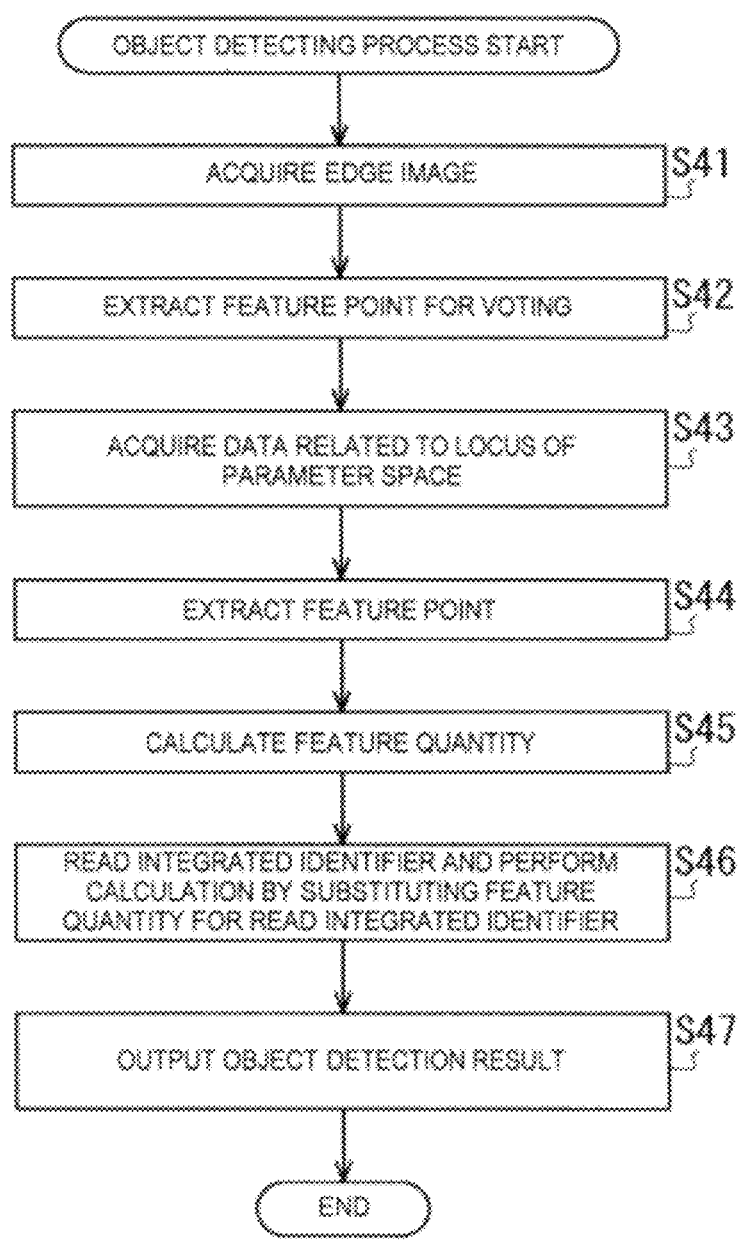
FIG. 14 is a flowchart to explain an example of an object detecting process by a recognizing apparatus illustrated in FIG. 12.

Next, an example of an object detecting process by the recognizing apparatus 213 illustrated in FIG. 12 will be described with reference to a flowchart of FIG. 14.

In step S41, the Hough transform unit 230 acquires an edge image of a learning image.

In step S42, the Hough transform unit 230 extracts a feature point for voting in the parameter space based on the edge image acquired in the process of step S41. All pixels of the edge image may be extracted as the feature points for voting in the parameter space.

In step S43, the Hough transform unit 230 votes on each feature point extracted in the process of step S42 in the parameter space, and acquires data related to a locus within the parameter space obtained as a result of voting.

In step S44, the feature point extracting unit 231 extracts pixels of the image acquired in the process of step S43 as feature points. Here, feature points corresponding to the feature points extracted in the process of step S24 of FIG. 13 are extracted.

In step S45, the feature quantity calculating unit 232 calculates a feature quantity on each feature point supplied from the feature point extracting unit 231. At this time, for example, a numerical value representing a brightness value of a pixel is calculated as the feature quantity.

In step S46, the identification calculating unit 235 reads the identification feature quantity and the integrated identifier from the identifier recording unit 12 and performs a calculation by substituting a feature quantity for the read integrated identifier.

Here, the feature quantity substituted for the weak identifier configuring the integrated identifier refers to a feature quantity obtained from a feature on the input image, which is at the same position as the feature point of the learning image, from which a feature quantity regarded as the identification feature quantity is obtained. Further, the feature quantity as the identification feature quantity refers to a feature quantity used to set the weak identifier configuring the integrated identifier at the time of the learning process.

As a result of the calculation of step S46, "+1" representing that the recognition target object is present in the input image or "−1" representing that the recognition target object is not present in the input image is obtained. The identification calculating unit 235 supplies the calculation result based on the integrated identifier to the identification result output unit 236.

In step S47, the identification result output unit 236 outputs the detection result of the recognition target object. In other words, an identification result about whether or not the recognition target object has been recognized in the input image is output.

In this way, the object detecting process is executed.

The above description has been made in connection with the example in which a straight line in an image is detected using the Hough transform. However, for example, a circle in an image can be detected using the Hough transform.

Here, it is assumed that a circle is formed by a plurality of feature points in an image. The circle in the image is expressed by Formula (8). In Formula (8), a pixel position in an image is represented by (u, v) coordinates, and variables a, b, and r are parameters for deciding the size and position of the circle.

$$(u-a)^2+(v-b)^2=r^2 \tag{8}$$

In Formula (8), when coordinates (ui,vi) (i=1, 2, ..., n) of a feature point are given, a locus represented by Formula (9) is predicted in a three-dimensional space (abr space) in which the parameters of the circle of Formula (8) are used as axes.

$$(a-u_i)^2+(b-v_i)^2=r^2 \tag{9}$$

For example, it is assumed that a feature point represented by coordinates (u1, v1) is presented in an image as illustrated in the left side of FIG. 15. In this case, a locus of a circular cone shape is depicted in the abr space in which the parameters of the circle are used as the axes as illustrated in the right side of FIG. 15. By detecting an intersection point (A, B, R) of loci obtained by voting on a plurality of feature points in an actual image space (uv space) in the parameter space (abr space), the presence of the circle represented by Formula (10) in an image is detected.

$$(u-A)^2+(v-B)^2=R^2 \tag{10}$$

As described above, the circle can be detected using the Hough transform.

In addition, a graphic expressed by a certain formula can be detected using the Hough transform in the above-described way.

A series of processes described above may be performed by hardware or software. When a series of processes is performed by software, a program configuring the software is installed in a computer incorporated into dedicated hardware, a general-purpose personal computer 700 illustrated in FIG. 16 in which various programs can be installed and various functions can be executed, or the like from a network or a recording medium.

Figure 16:
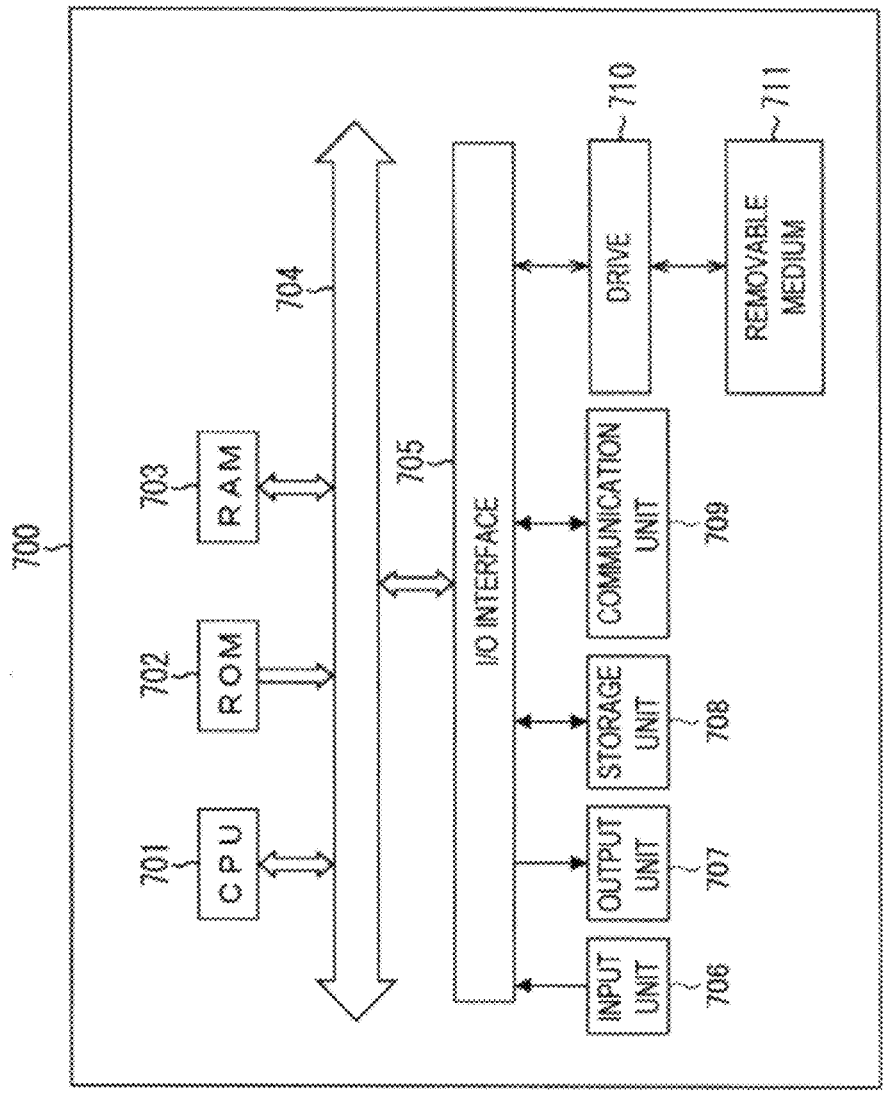
FIG. 16 is a block diagram illustrating a configuration example of a personal computer.

Referring to FIG. 16, a central processing unit (CPU) 701 executes a variety of processes according to a program recorded in a read only memory (ROM) 702 or according to a program loaded in a random access memory (RAM) 703 from a storage unit 708. Further, for example, data necessary for the CPU 701 to execute a variety of processes is appropriately stored in the RAM 703.

The CPU 701, the ROM 702, and the RAM 703 are connected to one another via a bus 704. An input/output (I/O) interface 705 is also connected to the bus 704.

An input unit 706 such as a keyboard or a mouse and an output unit 707 such as a display device including a liquid crystal display (LCD) and a speaker, a storage unit 708 configured with a hard disk or the like, and a communication unit 709 configured with a modem, a network interface card such as a LAN card, or the like are connected to the I/O interface 705. The communication unit 709 performs a communication process via a network including the Internet.

Further, a drive 710 is connected to the I/O interface 705 as necessary, and a removable medium 711 including a magnetic disk, an optical disc, a magneto-optical disc, or a semiconductor memory is appropriately mounted. A computer program read from the removable medium 711 is installed in the storage unit 708 as necessary.

When a series of processes is performed by software, a program configuring the software is installed from a network such as the Internet or a recording medium including the removable medium 711.

The recording medium may be configured with the removable medium 711 which is distributed in order to provide a user with a program separately from a device body as illustrated in FIG. 16 and includes a magnetic disk (including a floppy disk (a registered trademark)), an optical disc (including a compact disc (CD)-ROM, a digital versatile disc (DVD), or the like), a magnetic optical disc (including a MiniDisc (MD) (a registered trademark)), a semiconductor memory, or the like, which records a program. Further, the recording medium may be configured with the ROM 702 in which a program is recorded, a hard disk included in the storage unit 708, or the like, which is provided to the user in a state incorporated in a device body in advance.

Further, in this technology, a series of processes described above includes not only processes which are performed in time series in the described order but also processes which are executed in parallel or individually, and not necessarily performed in time series.

Further, the embodiments of the present technology are not limited to the above-described embodiments, and various modifications can be made within a range not departing from the gist of the present technology.

The present technology may have the following configuration.

(1) A recognizing apparatus, including:
a Hough transform unit that executes a Hough transform on an input image; and
a detecting unit that detects a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

(2) The recognizing apparatus according to (1),
wherein the Hough transform unit acquires locus data that relates to a locus for specifying a predetermined graphic included in the input image and corresponds to a feature point using the Hough transform, and
the detecting unit detects the recognition target object from the input image, based on a plurality of feature quantities, using an identifier generated by statistical learning that uses the plurality of feature quantities, the plurality of feature quantities being obtained from the locus data obtained based on the learning image including the recognition target object and the locus data obtained based on the learning image including no recognition target object.

(3) The recognizing apparatus according to (1) or (2), further including
a feature point extracting unit that extracts a predetermined feature point obtained from the input image,
wherein the feature point extracting unit extracts the feature point from an edge image obtained by executing a predetermined filtering process on the input image, and
data obtained by executing the Hough transform includes data that relates to a locus for specifying a predetermined graphic included in the edge image.

(4) The recognizing apparatus according to (1) or (2), further including
a feature point extracting unit that extracts a predetermined feature point obtained from the input image,
wherein the feature point extracting unit extracts the feature point from an image in which a pixel value of an edge image obtained by executing a predetermined filtering process on the input image is binarized by a predetermined threshold determination and an edge is thinned.

(5) The recognizing apparatus according to any one of (1) to (4),
wherein the Hough transform unit acquires locus data that relates to a locus for specifying a predetermined graphic included in the input image and corresponds to a feature point using the Hough transform, and
the locus data includes data that relates to a locus obtained by voting on the feature point in a parameter space in which each parameter of a formula representing a predetermined graphic is used as an axis.

(6) The recognizing apparatus according to any one of (1) to (4),
wherein the Hough transform unit acquires locus data that relates to a locus for specifying a predetermined graphic included in the input image and corresponds to a feature point and corresponds to a feature point using the Hough transform, and
the Hough transform unit specifies a predetermined graphic by a function related to polar coordinates and acquires locus data corresponding to the feature point using the Hough transform.

(7) A recognizing method, including:
executing a Hough transform on an input image by a Hough transform unit; and
detecting, by a detecting unit, a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

(8) A program for causing a computer to function as:
a Hough transform unit that executes a Hough transform on an input image; and
a detecting unit that detects a recognition target object from the input image, based on a plurality of feature quantities, using an identifier generated by statistical learning using the plurality of feature quantities, the plurality of feature quantities being obtained from data obtained by executing the Hough transform on a learning image including the recognition target object and data obtained by executing the Hough transform on a learning image including no recognition target object.

(9) A recording medium recording the program recited in (8).

The present technology contains subject matter related to that disclosed in Japanese Priority Patent Application JP 2011-131681 filed in the Japan Patent Office on Jun. 13, 2011, the entire content of which is hereby incorporated by reference.

What is claimed is:

1. A recognizing apparatus, comprising:
processing circuitry configured to
execute a Hough transform on a first learning image that includes a recognition target object;
execute the Hough transform on a second learning image that does not include the recognition target object;
acquire locus data of a locus for specifying a predetermined graphic in an input image, the locus data corresponding to a feature point from the execution of the Hough transforms on the first learning image and the second learning image;
obtain a plurality of feature quantities from the locus data;
generate an identifier by statistical learning using the plurality of feature quantities from the locus data;
execute the Hough transform on the input image; and
determine whether the input image includes the recognition target object, based on the plurality of feature quantities, using the identifier.

2. The recognizing apparatus according to claim 1, wherein the processing circuitry is further configured to
execute a predetermined filtering process on the input image to obtain an edge image,
extract a predetermined feature point from the edge image, and
data obtained by executing the Hough transform includes the locus data for specifying the predetermined graphic included in the edge image.

3. The recognizing apparatus according to claim 1, the processing circuitry is further configured to
extract a predetermined feature point from the input image, and
extract the feature point from an edge image in which a pixel value of the edge image is binarized by a predetermined threshold determination, an edge of the edge image is thinned, wherein
the processing circuitry executes a predetermined filtering process on the input image to obtain the edge image.

4. The recognizing apparatus according to claim 1, wherein
the locus data includes data relating to a locus obtained by voting on the feature point in a parameter space in which each parameter of a formula representing a predetermined graphic is used as an axis.

5. The recognizing apparatus according to claim 1, wherein the processing circuitry is further configured to
specify the predetermined graphic by a function related to polar coordinates.

6. The recognizing apparatus according to claim 1, wherein the processing circuitry is further configured to
execute a predetermined filtering process on the first learning image to obtain a first edge image,
extract a plurality of feature points from the first edge image,
vote on each feature point extracted from the first edge image to acquire first data related to a locus of a parameter space based on the first edge image, and
calculate the plurality of feature quantities based on the first data related to the locus.

7. The recognizing apparatus according to claim 6, wherein the processing circuitry is further configured to
execute the predetermined filtering process on the second learning image to obtain a second edge image,
extract a plurality of feature points from the second edge image,
vote on each feature point extracted from the second edge image to acquire second data related to a locus of a parameter space based on the second edge image,
calculate the plurality of feature quantities based on the second data related to the locus, and
generate the identifier by statistical learning using the plurality of feature quantities calculated based on the first data and the second data.

8. A recognizing method, comprising:
executing, by processing circuitry, a Hough transform on a first learning image that includes a recognition target object;
executing, by the processing circuitry, the Hough transform on a second learning image that does not include the recognition target object;
acquiring, by the processing circuitry, locus data of a locus for specifying a predetermined graphic in an input image, the locus data corresponding to a feature point from the execution of the Hough transforms on the first learning image and the second learning image;
obtaining, by the processing circuitry, a plurality of feature quantities from the locus data;
generating, by the processing circuitry, an identifier by statistical learning using the plurality of feature quantities;
executing, by the processing circuitry, the Hough transform on the input image; and
determining, by the processing circuitry, whether the input image includes the recognition target object, based on the plurality of feature quantities, using the identifier.

9. A non-transitory computer readable medium storing computer readable instructions that, when executed by a computer that includes processing circuitry, cause the computer to:
execute a Hough transform on a first learning image that includes a recognition target object;
execute the Hough transform on a second learning image that does not include the recognition target object;
acquire locus data of a locus for specifying a predetermined graphic in an input image, the locus data corresponding to a feature point from the execution of the Hough transforms on the first learning image and the second learning image;
obtain a plurality of feature quantities from the locus data;
generate an identifier by statistical learning using the plurality of feature quantities from the locus data;
execute the Hough transform on the input image; and
determine whether the input image includes the recognition target object based on the plurality of feature quantities, using the identifier.

* * * * *